Aug. 15, 1944.           A. T. SMITH           2,355,756
PLASTIC MATERIAL AND METHOD OF WATERPROOFING THE SAME
Original Filed Aug. 26, 1942
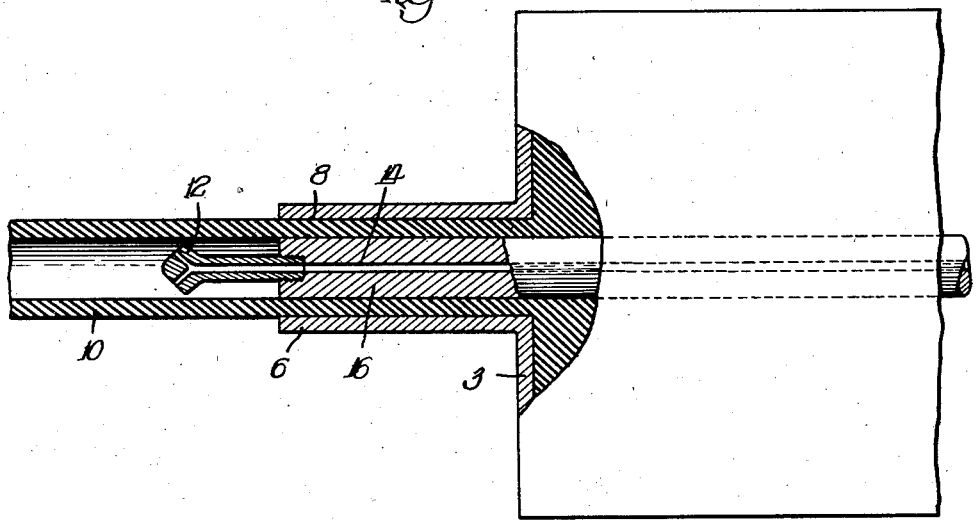
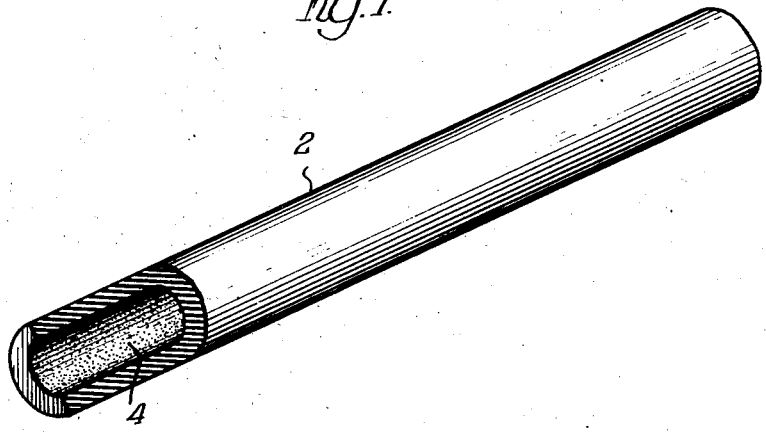
INVENTOR.
Alva T. Smith,
BY
Wilkinson, Huxley, Byron & Knight
attys.

Patented Aug. 15, 1944

2,355,756

UNITED STATES PATENT OFFICE 2,355,756

PLASTIC MATERIAL AND METHOD OF WATERPROOFING THE SAME

Alva T. Smith, Milwaukee, Wis., assignor to The Sunlite Mfg. Company, Milwaukee, Wis., a corporation of Wisconsin Continuation of application Serial No. 456,288, August 26, 1942. This application March 25, 1943, Serial No. 480,479

3 Claims. (Cl. 138—68)

The present invention relates to plastic materials and more in particular to novel means for and methods of rendering such plastic materials waterproof and embodying or incorporating in their structure the characteristics of having heat reflecting properties.

Among the objects of the present invention is to provide a new article formed from plastic material and embodying a coating applied to at least one surface of said plastic material to render the same waterproof and to give to said plastic material the property of reflecting heat.

Another object of the present invention is to provide a novel process of forming the article of manufacture immediately above identified.

At the present time there are a number of thermoplastic and thermo-setting materials which find use as substitutes for essential war materals and in their own right have properties which make them particularly adapted for many and varied uses other than as substitute materials, such materials, however, in a good many uses involving their association with water and other fluids becoming milky and white because of their fluid absorption properties, thus making the particular materials rather unsightly and unfortunately giving the user the impression that the material has deteriorated to such an extent as to require replacement and thereby giving the seller considerable cause for concern from such complaints. In other instances waterproofness is a desirable characteristic for such plastic materials, irrespective of the ability of the waterproof material to prevent the milky or cloudy appearance therein as mentioned above. In addition, it has been found that such materials become brittle and easily fractured after the same have been used for a period of time in contact with water, moisture and other fluids. Such brittleness results, apparently, from the extraction of plasticizers used in forming the said materials which are gradually taken therefrom by the water or other fluids passing over or through the same. It has been found, however, that where such materials are waterproofed by the application of a suitable coating, the extraction of such plasticizers is greatly retarded, with the result that the material retains its flexibility over a greater period of time.

The present invention has to do particularly with this problem of making such plastic materials waterproof and to eliminate the milky or white appearance therein which would otherwise occur upon fluid absorption and to prevent the material from becoming brittle as above described. The said invention is further grounded upon the desire to incorporate and embody in such plastic materials additional structural features and characteristics leading to novel results by giving said plastic materials heat reflecting properties to greatly increase their normal serviceable life and to improve the thermal efficiency thereof.

More particuarly, the invention is directed to the application of material to at least one of the surfaces of a conduit or other like device normally used for conducting fluids, to give to the said conduit waterproof and heat reflecting properties. In more particular aspects of the invention, the same embodies the idea of applying plastic material to the surface of the conduit which has metallic material incorporated therein, and which plastic material impregnated with the metallic substance adheres to the surface of the conduit to give the same the properties hereinabove enumerated.

Further, the invention has as an object a novel process for coating the said conduit of plastic material for the purposes above described. For example, the plastic material impregnated with some suitable waterproofing material may be sprayed or otherwise applied to the interior surface of the pipe as the same is continuously extruded from a device having the proper dies to form a conduit of the size and shape desired.

Other objects, features, capabilities and advantages are comprehended by the invention, as will later appear and as are inherently possessed thereby.

The present application is a continuation of application Serial No. 456,288, filed August 26, 1942, for Thermo-plastic materials and method of waterproofing the same.

Referring to the drawing:

Figure 1 is a view in perspective with parts broken away of a conduit embodying the invention herein disclosed; and Figure 2 is a diagrammatic sketch in elevation of a machine, with parts broken away, to show more in detail the means for coating the interior of the conduit shown in Figure 1 of the drawing.

Referring now more in detail to the drawing, an article made in accordance with the present invention is shown in Figure 1 as comprising a conduit 2 of plastic material, having a surface such as the inside surface 4 thereof, coated with material which is characterized as being waterproof. While the invention is disclosed in connection with a conduit of annular formation and having the coating applied to the inside surface thereof, nevertheless the invention comprehends the application of a coating of the character described to other surfaces of conduits, as well as other bodies of plastic material, for the purpose of rendering the same waterproof.

The present invention is more particularly directed to the application of a waterproof coating such as 4 to plastic material which normally tends to become milky or white due to the absorption of moisture, and which becomes brittle after use in contact with water or other fluids. The conduit disclosed in the drawing is made from a thermo-plastic material sold under the trade name of "Koroseal," which is a polymer of one of the vinyl halides, such as polyvinyl chloride or the like. The invention, however, comprehends improvements in both thermo-plastic and thermo-setting materials. Other materials, for example, which become milky and brittle after being in contact with water or other fluids, are cellulose ethers, such as ethyl cellulose, which is a thermo-plastic material. The thermo-plastic material sold under the name of "Vinylite," which consists of a co-polymer of a vinyl halide and vinyl acetate, is also deficient in the above respects. Polyvinyl butyral is a further illustration of a thermo-plastic and thermo-setting material which is affected by water and other fluids in the manner indicated.

As immediately above indicated, while the invention is directed to the prevention of a milky appearance in the plastic material due to the absorption of moisture and to prevent the material from becoming brittle, nevertheless certain of the coatings to be hereinafter described have the further property of reflecting heat, which gives added advantages to the finished product.

The coating 4, as shown in Figure 1, may comprise a layer of material comprising a carrying agent and a metallic or non-metallic pigment. Any suitable pigment, such as aluminum powder, lead oxide or titanium oxide, representing the metallic materials can be used and all of which have the further property of reflecting heat and light. Aluminum is an excellent example of a material which has heat reflecting properties to a high degree. Representative of non-metallic pigments which are suitable are carbon black, graphite, silica and powdered mica, all of which in varying degrees have the property of reflecting light and heat, although carbon black and graphite are relatively deficient in this respect. The said coating is applied as a fluid impregnated with the pigment in the form of a powder or the like. While it has been found that various types of carrying agents for the pigment may be used, nevertheless the use of a thin solution of the plastic material conforming to that from which the conduit is made and in which the pigment is suspended, gives a high degree of efficiency and serves to completely secured the pigment or particles to the inside surface of the conduit without affecting the normal characteristics of the conduit.

It is, of course, understood that rendering of the plastic material waterproof is effected by the leafing of the pigment or the building up of a barrier on the surface thereof. Waterproofing of the plastic materials is further assured in those cases where the coating is applied thereto while hot, inasmuch as such materials in such state are in an expanded condition and when cooled contract to increase the anchoring of the coating thereto.

The layer or coating of such materials not only renders the conduit waterproof to prevent absorption of moisture which would otherwise cause the milky appearance and brittleness to which reference has been made above, but certain of the said materials cause the reflection of heat rays, thus making the conduit as shown particularly desirable as a garden hose or for other general outdoor uses, inasmuch as the coating causes the reflection of a greater portion of the heat rays from the sun, thus preventing rot and greatly increasing the life of said conduit. Such latter coatings also have the further inherent characteristics of preventing loss of heat by radiation from the fluid being transmitted through the conduit where the same is used for conveying hot fluids or the like.

The present invention further contemplates a device for producing a conduit such as shown in Figure 1, the said apparatus for performing this operation being somewhat diagrammatically shown in Figure 2 of the drawing. Therein is disclosed a receptacle 3 for holding a predetermined quantity of material and which container has associated therewith any suitable device for extruding the said plastic material under pressure through the die 6. The die 6 is formed with the annular orifice 8 which causes a continuous stream of plastic material to be extruded therethrough, as at 10. In this particular instance the conduit as shown is provided with a coating applied to its interior surface so that the structure shown in Figure 2 embodies a nozzle 12 disposed just beyond the die 6 and which nozzle 12, through the medium of a conduit 14, supplies the coating material under pressure to form a continuous coating to the inside surface 4 of the conduit.

Since the present invention contemplates a process for continuously forming the conduit 2, the said conduit 14 is provided within the inner die member 16 and extends through the container 3 to a suitable source of material for the coating. The showing in Figure 2 is intended merely to disclose diagrammatically one form of apparatus by which the process can be practised, and of course the invention is not limited thereto but comprehends other devices which might be used for applying surface coatings to bodies of plastic material, such as the conduit as herein disclosed, as well as to other bodies of plastic material for producing the results contemplated by the present invention.

While I have herein described illustrative embodiments of the invention and processes for making the same, it is to be understood that the invention is not limited thereto but may comprehend other details, features and process steps without departing from the spirit of the invention.

I claim:

1. As an article of manufacture, a body of normally flexible plastic material to at least one surface of which is applied a coating embodying a finely divided pigment-like material and a carrying agent of plastic material, said coating being characterized as being waterproof.

2. As an article of manufacture, a body of normally flexible plastic material to at least one surface of which is applied a coating embodying metallic material in a finely divided state and a carrying agent of plastic material, said coating being characterized as being waterproof and having heat reflecting properties.

3. As an article of manufacture, a conduit formed of normally flexible plastic material having an interior coating embodying finely divided particles of material and a carrying agent of plastic material, said coating being characterized as being waterproof.

ALVA T. SMITH.